United States Patent
Watanabe (10) Patent No.: US 11,679,813 B2
(45) Date of Patent: Jun. 20, 2023

(54) VEHICLE BODY REAR PART STRUCTURE

(71) Applicant: Honda Motor Co., Ltd., Tokyo (JP)

(72) Inventor: Yasunori Watanabe, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 166 days.

(21) Appl. No.: 17/465,838

(22) Filed: Sep. 2, 2021

(65) Prior Publication Data
US 2022/0073152 A1  Mar. 10, 2022

(30) Foreign Application Priority Data
Sep. 4, 2020  (JP) .............................. JP2020-149415

(51) Int. Cl.
*B62D 25/20* (2006.01)
*B62D 21/15* (2006.01)

(52) U.S. Cl.
CPC ..... *B62D 25/2027* (2013.01); *B62D 25/2036* (2013.01); *B62D 21/152* (2013.01)

(58) Field of Classification Search
CPC ............ B62D 25/2027; B62D 25/2036; B62D 21/152
USPC ............ 296/193.07, 203.04, 187.08, 187.11, 296/193.08
See application file for complete search history.

(56) References Cited

U.S. PATENT DOCUMENTS

| 2012/0256448 A1* | 10/2012 | Yasui | B62D 21/152 |
| | | | 296/209 |
| 2017/0113734 A1* | 4/2017 | Kato | B62D 25/08 |
| 2020/0094760 A1* | 3/2020 | Yamada | B62D 21/152 |

FOREIGN PATENT DOCUMENTS

JP  2014000861  1/2014

* cited by examiner

*Primary Examiner* — Amy R Weisberg
*Assistant Examiner* — E Turner Hicks
(74) *Attorney, Agent, or Firm* — JCIPRNET (57) ABSTRACT

A vehicle body rear part structure includes a pair of rear side frames on left and right sides that extend substantially along a vehicle front-rear direction; and a rear floor panel to whose front part region, where a rear seat is disposed, the pair of rear side frames are combined. A rear part region of the rear floor panel is configured by a double panel structure having an upper wall and a lower wall. The rear part region of the rear floor panel extends further to a vehicle rear side than the pair of rear side frames. Each rear end part of the pair of rear side frames includes an inclined support part that inclines toward a vehicle front side toward an inner side in a vehicle width direction. The double panel structure is combined to the inclined support part of each of the rear side frames.

20 Claims, 8 Drawing Sheets

VEHICLE BODY REAR PART STRUCTURE

CROSS-REFERENCE TO RELATED APPLICATION

This application claims the priority benefit of Japan application serial no. 2020-149415, filed on Sep. 4, 2020. The entirety of the above-mentioned patent application is hereby incorporated by reference herein and made a part of this specification.

BACKGROUND

Technical Field

The disclosure relates to a vehicle body rear part structure of an automobile.

Description of Related Art

At a vehicle body rear part of an automobile, rear side frames extending substantially along the vehicle front-rear direction are disposed on the left and right sides of the vehicle body, and a rear floor panel is supported by the rear side frames on the left and right sides. Further, a rear bumper beam extending substantially along the vehicle width direction is attached at the rear end parts of the rear side frames on the left and right sides.

In recent years, a vehicle body rear part structure has been designed so that when an impact load is applied to the vehicle from the rear of the vehicle body, the energy of the impact load can be absorbed by deformation or crushing of the rear bumper beam (for example, see Patent Document 1).

In the vehicle body rear part structure described in Patent Document 1, the rear floor panel in which a core material for load transmission to the rear bumper beam is disposed is combined to the rear side frames on the left and right sides extending substantially along the vehicle front-rear direction. When an impact load is applied from the rear of the vehicle body, the vehicle adopting this vehicle body rear part structure absorbs the applied impact by bending deformation or crushing of the rear bumper beam supported by the rear side frames.

RELATED ART

Patent Document

[Patent Document 1] Japanese Laid-open Publication No. 2014-861

However, since the conventional vehicle body rear part structure as described above relies on deformation or crushing of the rear bumper beam, when an impact load is applied to the vehicle body rear part in a biased manner to one of the left and right sides, deformation occurs in one of the rear side frames and the rear floor panel in the vicinity thereof. Therefore, the region on the other side of the vehicle body rear part cannot be effectively used for energy absorption.

Further, in the conventional vehicle body rear part structure as described above, since the rear side frames on the left and right sides extend to the rear end part of the vehicle body, it causes an increase in vehicle weight.

SUMMARY

In view of the above, the vehicle body rear part structure according to the disclosure adopts the following configurations.

That is, the vehicle body rear part structure according to the disclosure includes: a pair of rear side frames (for example, the rear side frames 2 of the embodiment) on left and right sides that extend substantially along a vehicle front-rear direction; and a rear floor panel (for example, the rear floor panel 3 of the embodiment) to whose front part region, where a rear seat is disposed, the pair of rear side frames are combined. A rear part region of the rear floor panel is configured by a double panel structure (for example, the double panel structure 14 of the embodiment) having an upper wall (for example, the upper wall 11 of the embodiment) and a lower wall (for example, the lower wall 12 of the embodiment) and extends further to a vehicle rear side than the pair of rear side frames. Each rear end part of the pair of rear side frames includes an inclined support part (for example, the inclined support part 20 of the embodiment) that inclines toward a vehicle front side toward an inner side in a vehicle width direction. The double panel structure is combined to the inclined support part of each of the rear side frames.

DESCRIPTION OF THE EMBODIMENTS

According to an embodiment of the disclosure, a vehicle body rear part structure capable of sufficiently absorbing an impact load applied to the vehicle body rear part without causing an increase in vehicle weight is provided.

In this case, since the double panel structure having the upper wall and the lower wall extends further to the rear side than the rear side frames on the left and right sides, when an impact load is applied to one of the left and right sides of the vehicle body rear part, the load is applied as a load in the shear direction to the upper wall and the lower wall of the double panel structure. At this time, a shear load acts on the upper wall and the lower wall of the double panel structure, and this shear load acts as a large reaction force against the applied impact, and effectively absorbs the energy of the impact load when the double panel structure is deformed out of the plane. Since the double panel structure is combined to each of the inclined support parts on the left and right sides having a substantially truncated-V-shape that spreads to the left and right toward the rear of the rear end parts of the rear side frames on the left and right sides, when an impact load is applied to the vehicle body rear part in a biased manner to one of the left and right sides, on the other of the left and right sides, shear deformation (out-of-plane deformation) of the upper wall and the lower wall in a wide range in the vehicle width direction is facilitated. At this time, since the front part region of the rear floor panel is combined to the rear side frames on the left and right sides having high rigidity, an occupant seated on the rear seat is not easily affected by the deformation of the double panel structure.

Further, since the rear side frames on the left and right sides do not extend to the vehicle rear end part, when an impact load is applied to the vehicle body rear part in a biased manner to one of the left and right sides, the deformation of the double panel structure on the other side in the left-right direction is not hindered by the rear side frame on the other side. Therefore, the energy of the impact load can be absorbed in a wide range on the left and right sides of the double panel structure. Further, in this configuration, since the rear side frames, which are large parts with high rigidity, do not extend to the vehicle rear end part, an increase in vehicle weight can be suppressed.

The double panel structure may include side walls (for example, the side walls 15 of the embodiment) that connect side edge parts on left and right sides of the upper wall and the lower wall, and a cross section of the double panel structure along the vehicle width direction may be formed in a substantially rectangular shape, and a bumper beam (for example, the bumper beam 7 of the embodiment) that extends substantially along the vehicle width direction may be continuously or discontinuously combined to rear parts of the upper wall and the lower wall over its entire width.

In this case, since the bumper beam is combined to the rear parts of the upper wall and the lower wall that form a rectangular cross section together with the side walls on the left and right sides, the impact load applied to the bumper beam can be received in a wide range of the double panel structure in the vehicle width direction. Therefore, when the impact load is applied, the energy of the impact load can be mainly absorbed by crushing the bumper beam having a larger amount of energy absorption instead of by bending deformation. Therefore, even if the bumper beam is made of resin or thinned to reduce the weight, the energy of the impact load can be sufficiently absorbed.

The double panel structure may include inclined front walls (for example, the inclined front walls 17 of the embodiment) that connect the upper wall and the lower wall, extend along the inclined support part of each of the rear side frames, and incline downward toward a rear side, and the inclined support part of each of the rear side frames may be combined to the inclined front wall.

In this case, the double panel structure is supported by the rear end parts (inclined support parts) of the rear side frames by the inclined front walls having a large area that incline downward toward the rear side. Therefore, when an impact load is applied from the vehicle body rear part, shear deformation of the upper wall and the lower wall of the double panel structure can be facilitated.

The double panel structure may include a front wall (for example, the front wall 16 of the embodiment) that connects a front edge part of the lower wall to the upper wall, and a rear wall (for example, the rear panel 6 of the embodiment) that connects rear edge parts of the upper wall and the lower wall, and the double panel structure may form a box structure as a whole.

In this case, since the overall strength of the double panel structure is increased, shear deformation of the upper wall and the lower wall when an impact load is applied to the vehicle body rear part can be facilitated.

In the double panel structure, a reinforcing rib (for example, the reinforcing ribs 31 of the embodiment) that extends in the vehicle front-rear direction may be disposed in the box structure.

In this case, since the reinforcing rib can suppress the local deformation of the box structure, energy can be absorbed in a wide range of the double panel structure.

The double panel structure may be formed of steel plates with a tensile strength of 1500 MPa or more.

In this case, the double panel structure can be made lighter, and the deformation of the vehicle body can be suppressed when a light load is applied to the vehicle body rear part, and when an impact load is applied to the vehicle body rear part, a large amount of energy can be absorbed by the double panel structure.

In the upper wall of the double panel structure, a strength of a rear edge part (for example, the rear edge part 11e of the embodiment) may be set lower than a strength of other parts.

In this case, when an impact load is applied to the vehicle body rear part, the double panel structure can be sequentially deformed from the rear part side to the front side. Therefore, the energy of the impact load can be absorbed more efficiently.

The lower wall of the double panel structure may have an opening (for example, the opening 30 of the embodiment), and a region on a rear side (for example, the region 12Ar on the rear side of the embodiment) of the opening may be formed to be thicker than other regions.

In this case, since the lower wall of the double panel structure is provided with the opening, the opening can be used as a part disposition space. Further, since the region on the rear side of the opening of the lower wall is formed thicker than the other regions, when an impact load is applied to the vehicle body rear part, the shear deformation of the lower wall in the entire region in vehicle width direction can be prevented from being hindered by the opening.

The upper wall of the double panel structure may extend to a region where the rear seat is disposed.

In this case, the region where the upper wall is shear-deformed when an impact load is applied to the vehicle body rear part can be greatly extended in the vehicle front-rear direction. Therefore, the amount of energy absorbed at the time of application of the impact load can be increased.

A plurality of concavo-convex parts (for example, the concavo-convex parts 18 of the embodiment) that extend along the vehicle front-rear direction may be formed on at least one of the upper wall and the lower wall of the double panel structure.

In this case, since the rigidity of the upper wall or the lower wall of the double panel structure in the vehicle front-rear direction increases, the load (peak load) at which the upper wall or the lower wall start to deform when an impact load is applied to the vehicle body rear part can be increased.

A plurality of concavo-convex parts (for example, the concavo-convex parts 218 of the embodiment) that extend along the vehicle width direction may be formed on at least one of the upper wall and the lower wall of the double panel structure.

In this case, when an impact load is applied to the vehicle body rear part, the upper wall or the lower wall can be easily buckled and deformed by the shear load due to the applied load. Therefore, the energy absorption of the double panel structure can be increased.

The inclined front walls may incline forward from lower ends toward upper sides, and an in-vehicle part (for example, the silencers 23 of the embodiment) may be disposed below at least one of the inclined front walls.

In this case, when an impact load is applied to the vehicle body rear part, and the double panel structure buckles toward the vehicle front side, the inclined front walls of the double panel structure are displaced downward and hit the in-vehicle part, and the inclined front walls guide the in-vehicle part and push the in-vehicle part downward. Therefore, the in-vehicle part can be prevented from interfering with the fuel tank or the like disposed in front of the in-vehicle part.

The double panel structure may include side walls (for example, the side walls 15 of the embodiment) on left and right sides that connect side edge parts of the upper wall and the lower wall; and a front wall (for example, the front wall 16 of the embodiment) that connects a front edge part of the lower wall to the upper wall, and the side walls may incline outward in the vehicle width direction from lower ends to upper sides, and the front wall may incline forward from a lower end toward an upper side.

In this case, it is possible to secure a space that spreads downward toward the side of the side walls and in front of the front wall of the double panel structure. Therefore, in-vehicle parts such as exhaust parts can be easily disposed in the space.

The double panel structure may be configured by a hollow tubular member.

In this case, the double panel structure can be manufactured at low cost by extrusion molding or pultrusion molding of aluminum or the like.

In the vehicle body rear part structure of the disclosure, the double panel structure of the rear part region of the rear floor panel extends further to the rear side than the rear side frames on the left and right sides, and is combined to the inclined support parts at the rear end parts of the rear side frames on the left and right sides. Therefore, the front-rear length of the rear side frames can be shortened, and the impact load applied to the vehicle body rear part can be efficiently absorbed in a wide range in the vehicle width direction. Therefore, when the disclosure is adopted, the impact load applied to the vehicle body rear part can be sufficiently absorbed without causing an increase in vehicle weight.

Hereinafter, embodiments of the disclosure will be described with reference to the drawings. In addition, an arrow FR pointing to the front side of the vehicle, an arrow UP pointing to the upper side of the vehicle, and an arrow LH pointing to the left side of the vehicle are shown at appropriate positions in the drawings. Further, in each embodiment, the common parts are denoted by the same reference numerals.

First Embodiment

Figure 1:
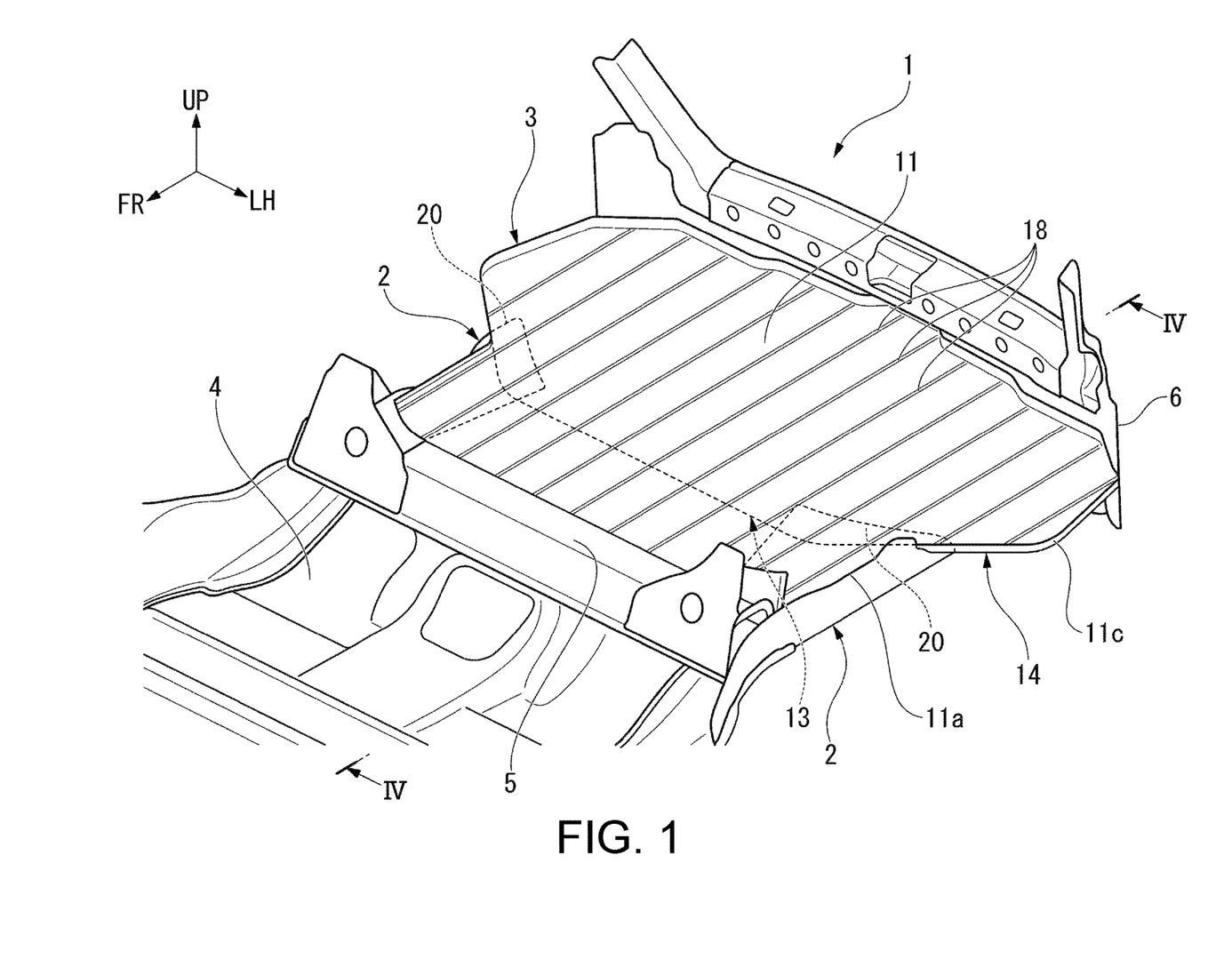
FIG. 1 is a perspective view of a vehicle body rear part of a first embodiment as viewed from above the front part of the vehicle.
Figure 2:
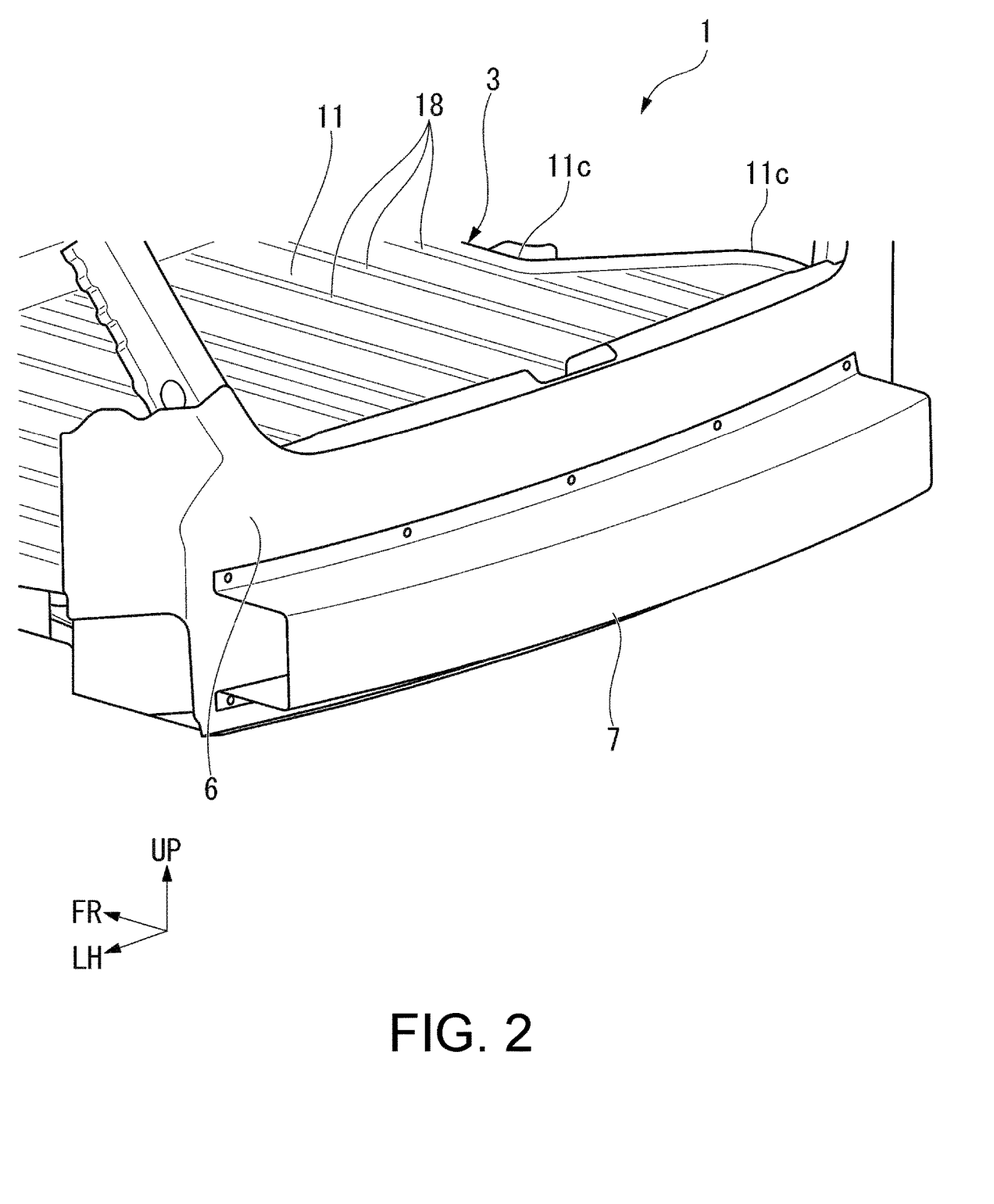
FIG. 2 is a perspective view of the vehicle body rear part of the first embodiment as viewed from above the rear part of the vehicle.

FIG. 1 is a view of a vehicle body rear part of a vehicle 1 of a first embodiment with some parts removed and viewed from the diagonally upper left side of the front part, and FIG. 2 is a view of the vehicle body rear part of the vehicle 1 with some parts removed and viewed from the diagonally upper left side of the rear part.

A pair of rear side frames 2 extending substantially along the vehicle front-rear direction are disposed on the left and right sides of the rear part region of the vehicle 1. The front region of a rear floor panel 3 is connected to the pair of rear side frames 2. A front floor panel 4 supported by side sills and cross members on the left and right sides (not shown) is disposed on the front side of the rear floor panel 3. A beam part 5 extending along the vehicle width direction is integrally formed at the front end part of the rear floor panel 3. A rear seat (not shown) is supported on the upper part of the beam part 5. The beam part 5 is formed by bending the front end part of an upper wall 11 (to be described later) of the rear floor panel 3 into a U-shaped cross section. The rear end part of the rear floor panel 3 is combined to a rear panel 6 of the vehicle body rear part. The rear panel 6 is a metal panel extending in the left-right direction and the up-down direction of the vehicle, and a bumper beam 7 on the rear side extending substantially along the vehicle width direction is combined to the rear surface side of the rear panel 6.

Figure 3:
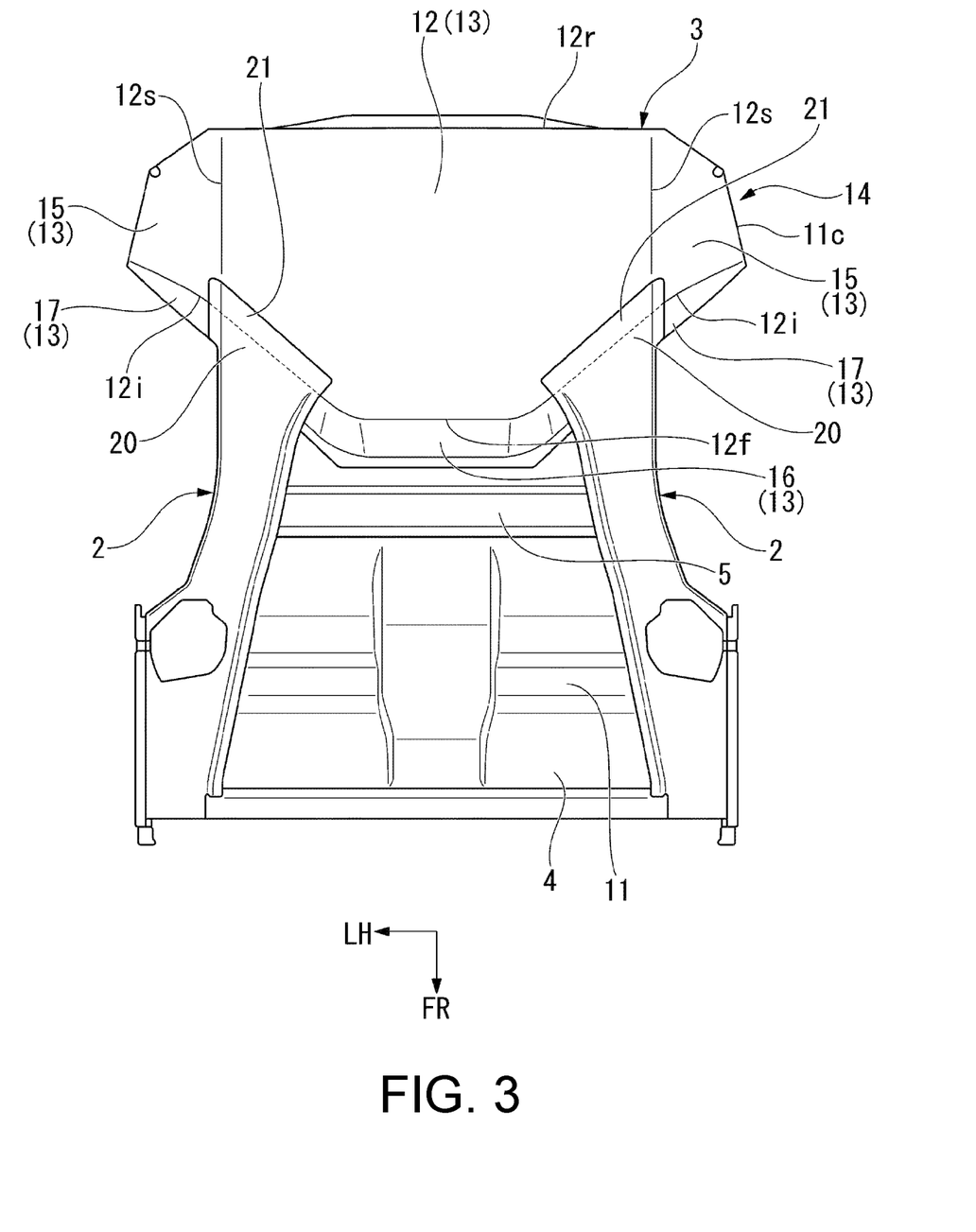
FIG. 3 is a view of the vehicle body rear part of the first embodiment as viewed from below the vehicle.
Figure 4:
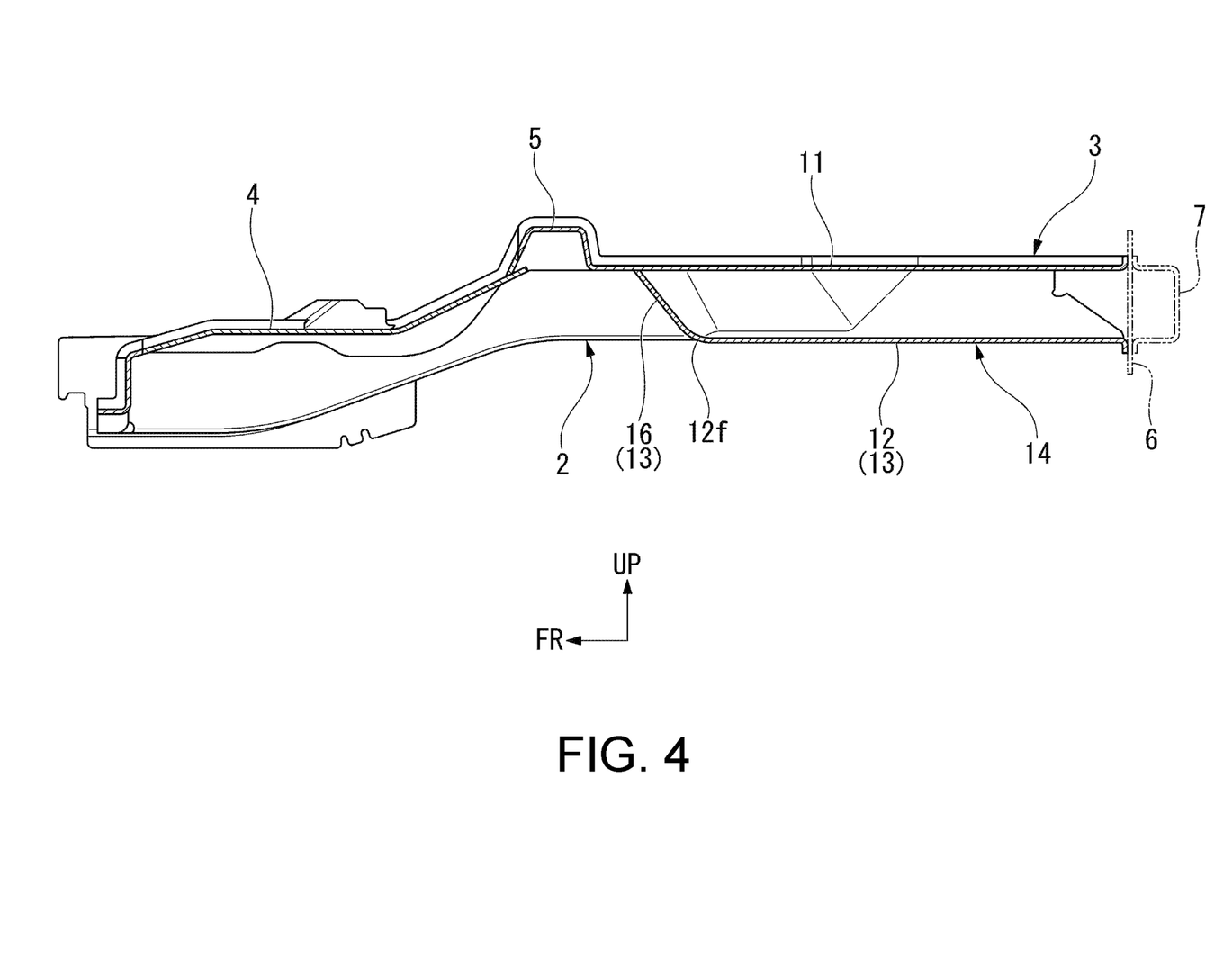
FIG. 4 is a cross-sectional view of the vehicle body rear part of the embodiment taken along the IV-IV line of FIG. 1.
Figure 5:
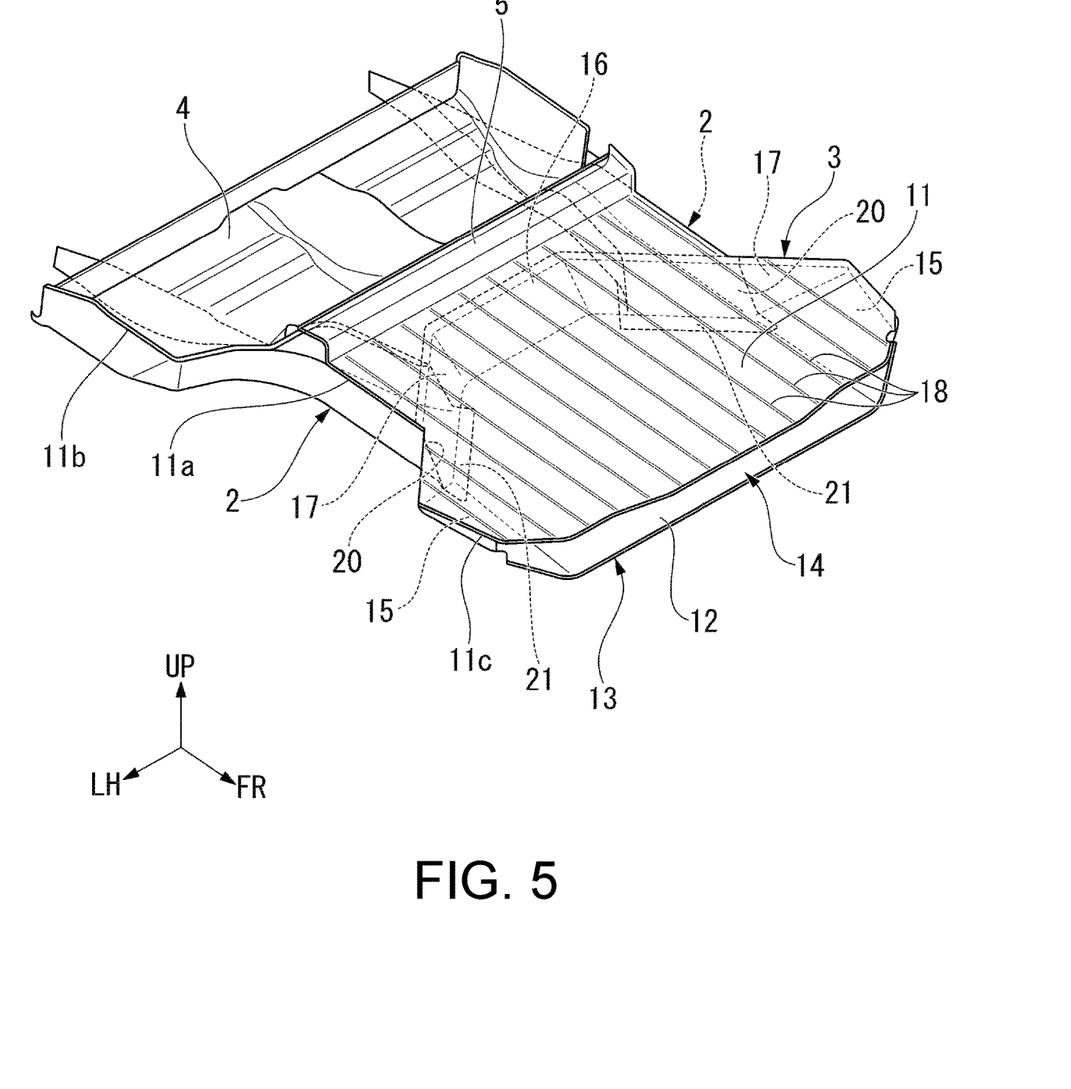
FIG. 5 is a perspective view of the vehicle body rear part of the embodiment as viewed from above the rear part of the vehicle.

FIG. 3 is a view of the pair of rear side frames 2 and the rear floor panel 3 of the vehicle body rear part as viewed from below the vehicle 1, and FIG. 4 is a cross-sectional view of the vehicle body rear part of FIG. 1 taken along the IV-IV line. Further, FIG. 5 is a view of the vehicle body rear part with some parts removed and viewed from the diagonally upper left side of the rear part of the vehicle 1.

As shown in these figures, the rear floor panel 3 includes an upper wall 11 at whose front end part the beam part 5 is formed and a lower wall 12 disposed below the rear region of the upper wall 11. The rear part region of the upper wall 11 and the lower wall 12 are disposed substantially horizontally. The lower wall 12 is integrally formed with a lower plate 13 joined to the lower surface of the rear part region of the upper wall 11. The upper wall 11 and the lower plate 13 are formed of, for example, metal plates made of aluminum or the like. The upper wall 11 and the lower plate 13 configure a double panel structure 14 in the rear part region of the rear floor panel 3.

The upper wall 11 has a narrow part 11a that has a narrow width in the vehicle width direction, a front widened part 11b that is continuously provided on the front side of the narrow part 11a and has a wider width in the vehicle width direction than the narrow part 11a, and a rear widened part 11c that is continuously provided on the rear side of the narrow part 11a and has a wider width in the vehicle width direction than the narrow part 11a. Each side edge part of the front widened part 11b and the rear widened part 11c protrudes further outward in the vehicle width direction than the side edge part of the narrow part 11a. On the left and right sides of the narrow part 11a are spaces for disposing the rear wheels. The lower plate 13 is joined to cross the lower surface of the rear widened part 11c and the lower surface of a part of the narrow part 11a.

In the case of this embodiment, a plurality of concavo-convex parts 18 extending in the vehicle front-rear direction are formed in almost the entire region of the upper wall 11.

As shown in FIG. 3, the lower wall 12 of the lower plate 13 is formed in a polygonal shape having lateral sides 12s on the left and right sides that extend substantially along the vehicle front-rear direction, a front side 12f that has a narrow width and extends along the vehicle width direction on the front side of the lateral sides 12s, front inclined sides 12i that linearly connect the front side 12f and the front end parts of the lateral sides 12s on the left and right sides, and a rear side 12r that connects the rear end parts of the lateral sides 12s on the left and right sides.

Side walls 15 that incline outward in the vehicle width direction from the lower end to the upper side are disposed extending from the lateral sides 12s on the left and right sides of the lower wall 12. A front wall 16 that inclines toward the front of the vehicle from the lower end to the upper side is disposed extending from the front side 12f of the lower wall 12. Further, inclined front walls 17 that incline diagonally outward from the front part of the vehicle from the lower end to the upper side (incline downward toward the rear side) are disposed extending from each of the front inclined sides 12*i* of the lower wall 12 on the left and right sides. The upper end parts of the side walls 15, the front wall 16, and the inclined front walls 17 are joined to the lower surface of the upper wall 11. The cross section of the double panel structure 14 along the vehicle width direction is formed in a horizontally long substantially rectangular shape.

Here, the rear side frames 2 on the left and right sides extend from the rear end part of the side sills (not shown) toward the rear end part of the vehicle body, but the rear end parts of the rear side frames 2 do not reach the rear end part of the vehicle body. Specifically, the rear side frames 2 on the left and right sides end at the front region of the double panel structure 14 of the rear floor panel 3. In other words, the rear region (double panel structure 14) of the rear floor panel 3 extends further to the rear side of the vehicle than the rear side frames 2 on the left and right sides.

Each rear end part of the rear side frames 2 on the left and right sides has an inclined support part 20 that inclines toward the vehicle front side along the inner side the vehicle width direction. The inclined support parts 20 of the rear side frames 2 on the left and right sides have a substantially truncated-V-shape that spreads to the left and right toward the vehicle rear side. In the case of the embodiment, the inclined support parts 20 also incline forward from the lower end toward the upper side. The inclined support parts 20 face the inclined front walls 17 on the corresponding left and right sides of the double panel structure 14, and are integrally connected to the inclined front walls 17 by welding or the like. The inclined front walls 17 on the left and right sides of the double panel structure 14 extend along the corresponding inclined support parts 20 of the rear side frames 2. Further, extension flanges 21 are disposed extending from the lower ends of the inclined support parts 20. The extension flanges 21 are overlapped with a part of the lower surface of the lower wall 12, and are connected to the lower wall 12 by welding or the like.

Further, the rear panel 6 (see FIGS. 2 and 4) is combined between the rear end part of the lower plate 13 and the rear end part of the upper wall 11 that configure the double panel structure 14 to close the gap between the two (see FIG. 5). In the embodiment, the rear panel 6 configures a rear wall that connects the rear edge parts of the upper wall 11 and the lower wall 12. The bumper beam 7 on the rear side is combined to the rear end parts of the upper wall 11 and the lower wall 12 of the double panel structure 14 with the rear panel 6 interposed therebetween. As a result, the double panel structure 14 has a box structure in which the peripheral region is closed. In this embodiment, the bumper beam 7 is continuously combined to the rear parts of the upper wall 11 and the lower wall 12 over its entire width. However, the bumper beam 7 may be discontinuously combined to the rear parts of the upper wall 11 and the lower wall 12.

Figure 6:
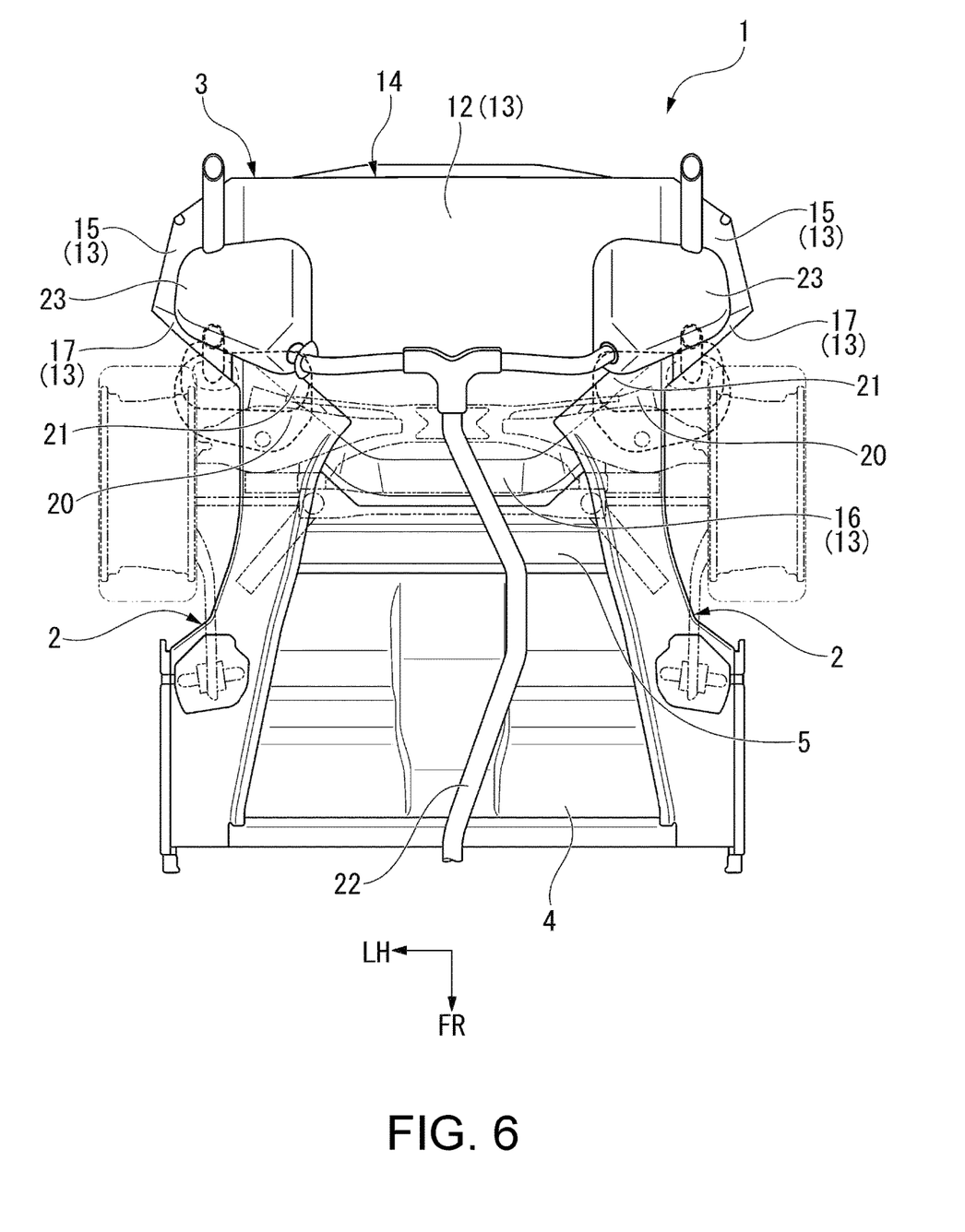
FIG. 6 is a view of the vehicle body rear part of the embodiment as viewed from below the vehicle.

FIG. 6 is a view of the vehicle body rear part as viewed from below the vehicle 1.

As shown in the figure, an exhaust pipe 22 extending from an engine (not shown) to the rear of the vehicle is disposed below the vehicle. The exhaust pipe 22 of the embodiment is branched to left and right parts, and silencers 23, which are in-vehicle parts, are connected to each of the branched ends. The silencers 23 on the left and right sides are disposed below the inclined front walls 17 on the left and right sides of the double panel structure 14, respectively. Further, if the exhaust pipe 22 is not branched into two parts and there is only one silencer 23, this silencer 23 is disposed below one of the inclined front walls 17 on the left and right sides of the double panel structure 14.

As described above, in the vehicle body rear part structure of the embodiment, the double panel structure 14 extends further to the rear side than the rear side frames 2 on the left and right sides. Therefore, when an impact load is applied to the vehicle body rear part in a biased manner to one of the left and right sides, the load is applied to the upper wall 11 and the lower wall 12 of the double panel structure 14 as a load in the shearing direction. As a result, a shear load acts on the upper wall 11 and the lower wall 12 of the double panel structure 14, and this shear load acts as a large reaction force against the applied impact, and effectively absorbs the energy of the impact load when the upper wall 11 and the lower wall 12 are deformed out of the plane.

Further, in the vehicle body rear part structure of the embodiment, since the double panel structure 14 is combined to each of the inclined support parts 20 on the left and right sides having a substantially truncated-V-shape that spreads to the left and right toward the rear of the rear end parts of the rear side frames 2 on the left and right sides, when an impact load is applied to the vehicle body rear part in a biased manner to one of the left and right sides, on the other of the left and right sides, shear deformation (out-of-plane deformation) of the upper wall 11 and the lower wall 12 in a wide range in the vehicle width direction is facilitated. Further, at this time, since the front part region of the rear floor panel 3 is combined to the rear side frames 2 on the left and right sides having high rigidity, an occupant seated on the rear seat is not easily affected by the deformation of the double panel structure 14.

Further, in the vehicle body rear part structure of the embodiment, since the rear side frames 2 on the left and right sides do not extend to the vehicle rear end part, when an impact load is applied to the vehicle body rear part in a biased manner to one of the left and right sides, the deformation of the double panel structure 14 on the other side in the left-right direction is not hindered by the rear side frame 2 on the other side. Therefore, the energy of the impact load can be absorbed in a wide range on the left and right sides of the double panel structure 14. Further, in this configuration, since the rear side frames 2, which are large parts with high rigidity, do not extend to the vehicle rear end part, an increase in vehicle weight can be suppressed.

Therefore, when the vehicle body rear part structure of the embodiment is adopted, the front-rear length of the rear side frames 2 can be shortened, and the impact load applied to the vehicle body rear part can be efficiently absorbed in a wide range in the vehicle width direction. Therefore, the impact load applied to the vehicle body rear part can be sufficiently absorbed without causing an increase in vehicle weight.

Further, in the vehicle body rear part structure of the embodiment, the shape of the cross section along the vehicle width direction is formed in a substantially rectangular shape, and the bumper beam 7 extending substantially along the vehicle width direction is continuously or discontinuously combined to the rear parts of the upper wall 11 and the lower wall 12 over the entire width. Therefore, the impact load applied to the bumper beam 7 can be received in a wide range of the double panel structure 14 in the vehicle width direction. Then, when the impact load is applied, the energy of the impact load can be mainly absorbed by crushing the bumper beam 7 having a larger amount of energy absorption instead of by bending deformation. Therefore, even if the bumper beam 7 is made of resin or thinned to reduce the weight, the energy of the impact load can be sufficiently absorbed.

Further, in the vehicle body rear part structure of the embodiment, the double panel structure 14 has the inclined front walls 17 extending along the inclined support parts 20 of the rear side frames 2, and the inclined support part 20 of each rear side frame 2 is combined to the inclined front wall 17. The inclined front walls 17 incline with respect to a surface orthogonal to the vehicle body front-rear direction and has a sufficiently large area. Therefore, when an impact load is applied from the vehicle body rear part, the inclined front walls 17 are firmly supported by the rear end parts of the rear side frames 2. Therefore, this configuration can facilitate shear deformation of the upper wall 11 and the lower wall 12 of the double panel structure 14.

Further, in the vehicle body rear part structure of the embodiment, the peripheral region of the double panel structure 14 is closed by a plurality of walls, whereby the entire double panel structure 14 forms a box structure. Therefore, the overall strength of the double panel structure 14 can be increased, and the shear deformation of the upper wall 11 and the lower wall 12 when an impact load is applied to the vehicle body rear part can be further facilitated.

Further, in the vehicle body rear part structure of the embodiment, the upper wall 11 of the double panel structure 14 extends to the region (beam part 5) where the rear seat is disposed. Therefore, the region where the upper wall 11 is shear-deformed when an impact load is applied to the vehicle body rear part can be greatly extended in the vehicle front-rear direction. Therefore, by adopting this configuration, the amount of energy absorbed at the time of application of the impact load can be further increased.

Further, in the vehicle body rear part structure of the embodiment, the inclined front walls 17 of the double panel structure 14 incline forward from the lower side to the upper side, and the silencers 23, which are in-vehicle parts, are disposed below the inclined front walls 17. Therefore, when an impact load is applied to the vehicle body rear part, and the double panel structure 14 buckles toward the vehicle front side, the inclined front walls 17 of the double panel structure 14 are displaced downward and hit the silencers 23, and the inclined front walls 17 guide the silencers 23 and push the silencers 23 downward. Therefore, when this configuration is adopted, the silencers 23 can be prevented from interfering with the fuel tank or the like disposed in front of the silencers 23 (in-vehicle parts).

Further, in the vehicle body rear part structure of the embodiment, the side walls 15 of the double panel structure 14 incline outward in the vehicle width direction from the lower end to the upper side, and the front wall 16 of the double panel structure 14 inclines forward from the lower end to the upper side. Therefore, it is possible to secure a space that spreads downward toward the side of the side walls 15 and in front of the front wall 16 of the double panel structure 14. Therefore, when this configuration is adopted, in-vehicle parts such as exhaust parts can be easily disposed in the space.

Second Embodiment

Figure 7:
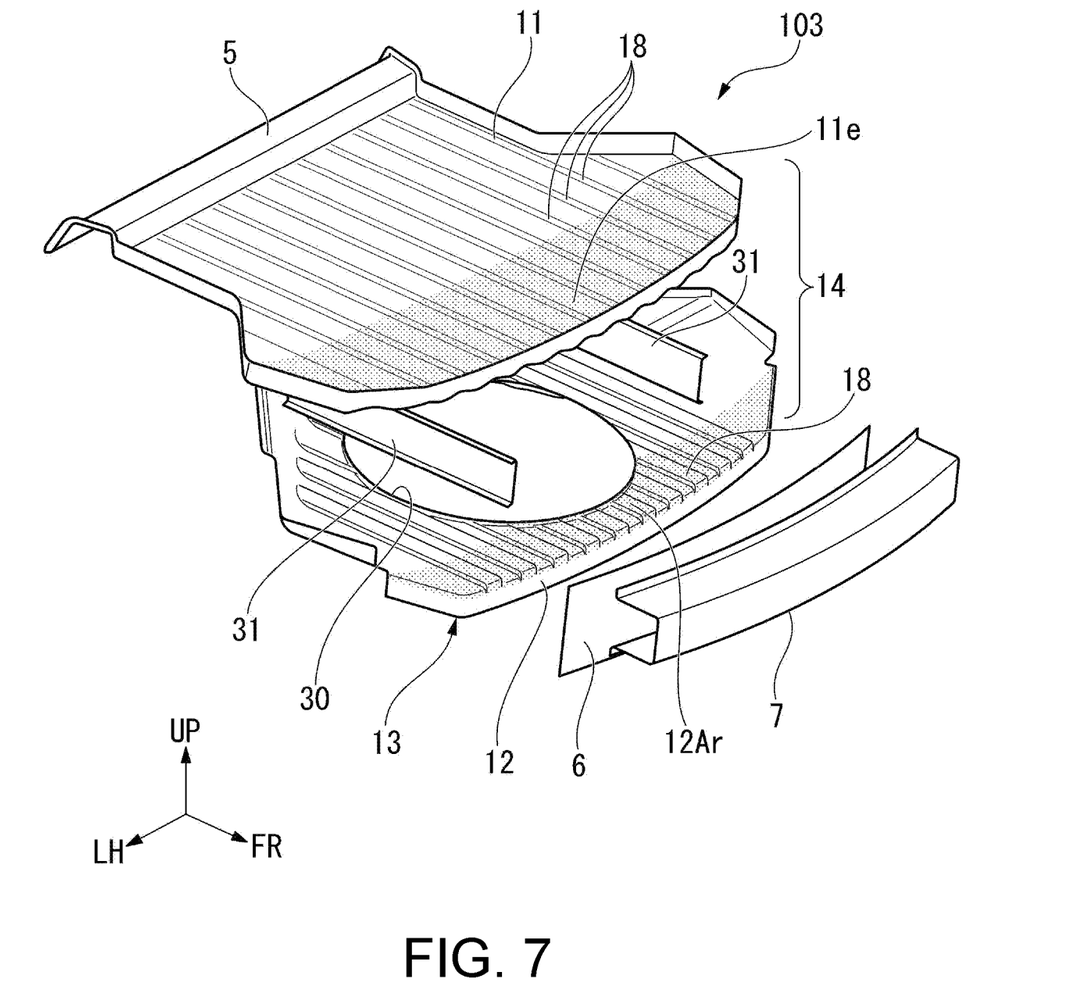
FIG. 7 is an exploded perspective view of a rear floor panel of a second embodiment.

FIG. 7 is an exploded perspective view of a rear floor panel 103 of a second embodiment.

Similar to the first embodiment, the rear floor panel 103 of this embodiment is provided with the beam part 5 for supporting the rear seat at the front end part of the front part region of the upper wall 11, and the lower plate 13 including the lower wall 12 is combined to the lower surface of the rear part region of the upper wall 11. The plurality of concavo-convex parts 18 (convex beads or concave grooves) extending along the vehicle front-rear direction are formed in the entire region of the upper wall 11 and the lower wall 12. Further, an opening 30 in a circular shape having a large inner diameter is formed at substantially the center of the lower wall 12. The side edge parts and the front edge part of the lower wall 12 have the same structures as those of the first embodiment, and the lower plate 13 is combined to the upper wall 11, whereby the double panel structure 14 is configured. The rear panel 6 is combined to the rear end parts of the upper wall 11 and the lower wall 12, and the bumper beam 7 on the rear side is combined to the rear end parts of the upper wall 11 and the lower wall 12 via the rear panel 6. As a result, the peripheral region of the double panel structure 14 is closed, and the entire structure forms a box structure.

A pair of reinforcing ribs 31 extending in the vehicle body front-rear direction are disposed inside the box structure of the double panel structure 14. Each reinforcing rib 31 is disposed at a position on the outer side in the vehicle width direction of the opening 30 in the circular shape of the lower wall 12. Each reinforcing rib 31 is combined to the upper surface of the lower wall 12 and the lower surface of the upper wall 11. Further, the reinforcing rib 31 may be integrally formed with the upper wall 11 and the lower wall 12.

Here, the upper wall 11 and the lower plate 13 configuring the double panel structure 14 are formed of steel plates with a tensile strength of 1500 MPa or more.

However, in the upper wall 11, the strength of a rear edge part 11e is set to be lower than that of other parts (the region on the front side of the rear edge part 11e).

Further, in the lower wall 12, a region 12Ar on the rear side of the opening 30 in the circular shape in the center is formed to be thicker than other regions.

As described above, since the vehicle body rear part structure of the embodiment has the same basic configuration as that of the first embodiment, the same basic effects as those of the first embodiment can be obtained.

In the vehicle body rear part structure of the embodiment, since the peripheral region of the double panel structure 14 is closed to form a box structure as a whole, the overall strength of the double panel structure 14 is increased, and shear deformation of the upper wall 11 and the lower wall 12 when an impact load is applied can be facilitated. In particular, in the embodiment, since the reinforcing ribs 31 extending in the vehicle front-rear direction are disposed in the box structure of the double panel structure 14, the reinforcing ribs 31 can divide the inside of the box structure and suppress local deformation of the box structure. Therefore, when an impact load is applied to the vehicle body rear part, the energy of the impact load can be absorbed in a wide range of the double panel structure 14.

Further, in the vehicle body rear part structure of the embodiment, the double panel structure 14 is formed of steel plates with a tensile strength of 1500 MPa or more. Therefore, the double panel structure 14 can be made lighter, and the deformation of the vehicle body can be suppressed when a light load is applied to the vehicle body rear part, and when an impact load is applied, a large amount of energy can be absorbed by the double panel structure 14.

Further, in the vehicle body rear part structure of the embodiment, the strength of the rear edge part 11e of the upper wall 11 of the double panel structure 14 is set to be lower than the strength of other parts of the upper wall 11. Therefore, when an impact load is applied to the vehicle body rear part, the double panel structure 14 can be sequentially deformed from the rear part side to the front side of the vehicle body. Therefore, when this configuration is adopted, the energy of the impact load can be absorbed more efficiently.

Further, in the vehicle body rear part structure of the embodiment, the region 12Ar on the rear side of the opening 30 of the lower wall 12 of the double panel structure 14 is formed to be thicker than other regions of the lower wall 12. Therefore, when an impact load is applied to the vehicle body rear part, the shear deformation of the lower wall 12 in the entire region in vehicle width direction can be prevented from being hindered by the opening 30. Therefore, when this configuration is adopted, the in-vehicle parts can be disposed in the lower center of the double panel structure 14 through the opening 30 without causing a decrease in energy absorption due to the opening 30.

Further, in the vehicle body rear part structure of the embodiment, a plurality of concavo-convex parts 18 extending in the vehicle front-rear direction are formed on the upper wall 11 and the lower wall 12 of the double panel structure 14. Therefore, the plurality of concavo-convex parts 18 can increase the rigidity of the upper wall 11 and the lower wall 12 of the double panel structure 14 in the vehicle front-rear direction. Therefore, when the vehicle body rear part structure of the embodiment is adopted, the load (peak load) at which the upper wall 11 and the lower wall 12 start to deform when an impact load is applied to the vehicle body rear part can be increased.

Further, in the embodiment, the plurality of concavo-convex parts 18 extending along the vehicle front-rear direction are formed on both the upper wall 11 and the lower wall 12, but the plurality of concavo-convex parts 18 extending along the vehicle front-rear direction may be formed on only one of the upper wall 11 and the lower wall 12.

Third Embodiment

Figure 8:
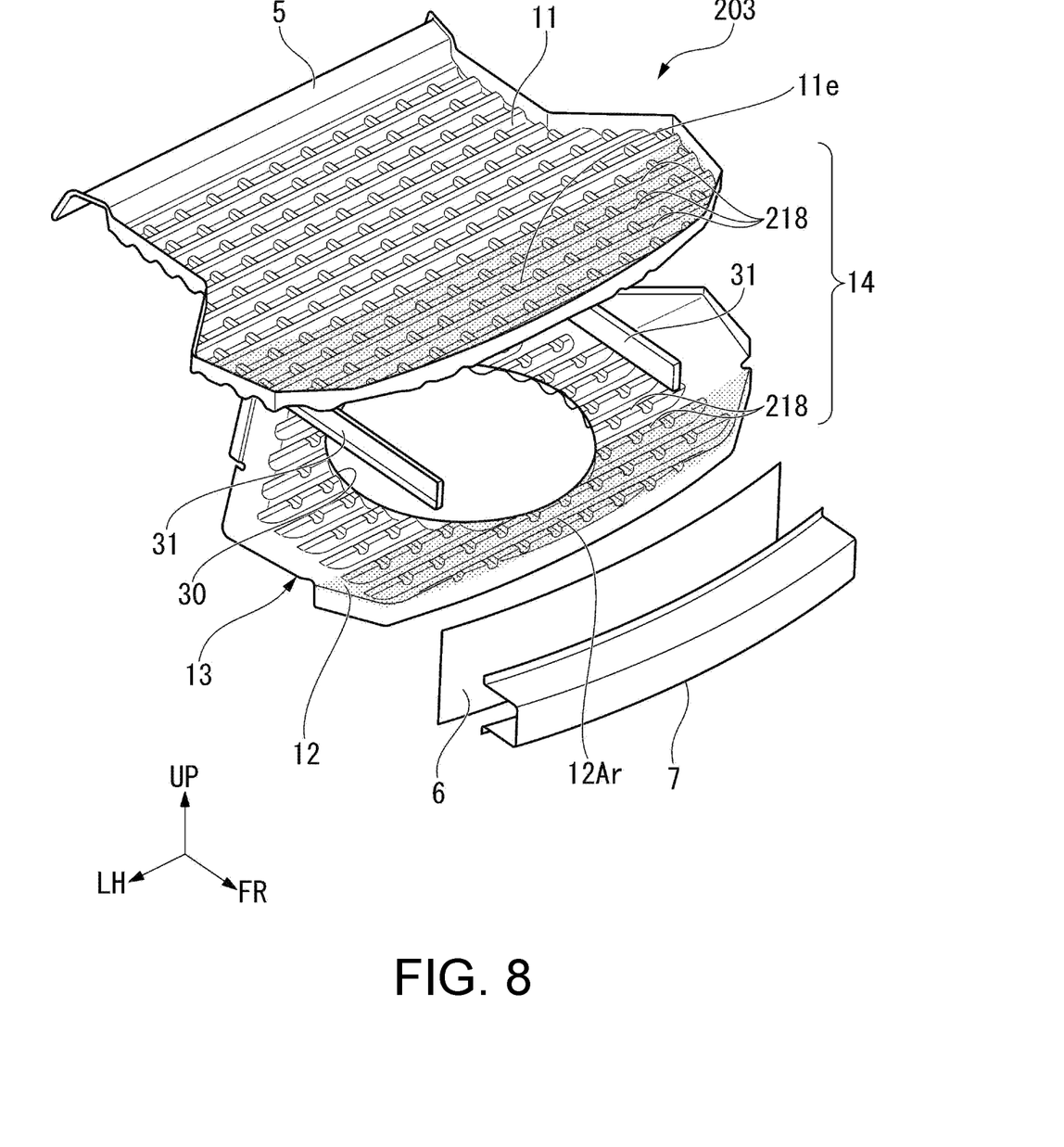
FIG. 8 is an exploded perspective view of a rear floor panel of a third embodiment.

FIG. 8 is an exploded perspective view of a rear floor panel 203 of a third embodiment.

The basic configuration of the rear floor panel 203 of this embodiment is substantially the same as that of the rear floor panel 103 of the second embodiment, but the extending direction of concavo-convex parts 218 formed on the upper wall 11 and the lower wall 12 is different from that of the second embodiment.

That is, in the rear floor panel 203 of the embodiment, a plurality of concavo-convex parts 218 are formed on the upper wall 11 and the lower wall 12 to extend along the vehicle width direction.

The vehicle body rear part structure of the embodiment is the same as that of the second embodiment except for the extending direction of the concavo-convex parts 218 formed on the upper wall 11 and the lower wall 12 of the rear floor panel 203. Therefore, when the vehicle body rear part structure of the embodiment is adopted, the same basic effects as those of the second embodiment can be obtained.

Further, in the vehicle body rear part structure of the embodiment, since the plurality of concavo-convex parts 218 extending along the vehicle width direction are formed on the upper wall 11 and the lower wall 12 of the rear floor panel 203, when an impact load is applied to the vehicle body rear part, the upper wall 11 and the lower wall 12 can be easily buckled and deformed by the shear load due to the applied load. Therefore, when the vehicle body rear part structure of the embodiment is adopted, the energy absorption of the double panel structure 14 can be further increased.

In the embodiment, the plurality of concavo-convex parts 218 extending along the vehicle width direction are formed on the upper wall 11 and the lower wall 12 of the rear floor panel 203, but the plurality of concavo-convex parts 218 extending along the vehicle width direction may be formed on only one of the upper wall 11 and the lower wall 12.

OTHER EMBODIMENTS

In each of the embodiments described above, the double panel structure at the rear part of the rear floor panel is formed by combining a plurality of plate materials, but the double panel structure may be configured by a hollow tubular member.

In this case, the double panel structure can be manufactured at low cost by extrusion molding or pultrusion molding of aluminum or the like.

In addition, the disclosure is not limited to the above embodiments, and various design changes can be made without departing from the spirit of the disclosure.

What is claimed is:

1. A vehicle body rear part structure comprising:
a pair of rear side frames on left and right sides that extend substantially along a vehicle front-rear direction; and
a rear floor panel to whose front part region, where a rear seat is disposed, the pair of rear side frames are combined,
wherein a rear part region of the rear floor panel is configured by a double panel structure having an upper wall and a lower wall and extends further to a vehicle rear side than the pair of rear side frames,
each rear end part of the pair of rear side frames comprises an inclined support part that inclines toward a vehicle front side toward an inner side in a vehicle width direction, and
the double panel structure is combined to the inclined support part of each of the rear side frames.

2. The vehicle body rear part structure according to claim 1, wherein the double panel structure comprises side walls that connect side edge parts on left and right sides of the upper wall and the lower wall, and a cross section of the double panel structure along the vehicle width direction is formed in a substantially rectangular shape, and
a bumper beam that extends substantially along the vehicle width direction is continuously or discontinuously combined to rear parts of the upper wall and the lower wall over its entire width.

3. The vehicle body rear part structure according to claim 1, wherein the double panel structure comprises inclined front walls that connect the upper wall and the lower wall, extend along the inclined support part of each of the rear side frames, and incline downward toward a rear side, and
the inclined support part of each of the rear side frames is combined to the inclined front wall.

4. The vehicle body rear part structure according to claim 2, wherein the double panel structure comprises inclined front walls that connect the upper wall and the lower wall, extend along the inclined support part of each of the rear side frames, and incline downward toward a rear side, and
the inclined support part of each of the rear side frames is combined to the inclined front wall.

5. The vehicle body rear part structure according to claim 3, wherein the double panel structure comprises:
a front wall that connects a front edge part of the lower wall to the upper wall; and
a rear wall that connects rear edge parts of the upper wall and the lower wall, and the double panel structure forms a box structure as a whole.

6. The vehicle body rear part structure according to claim 4, wherein the double panel structure comprises:
a front wall that connects a front edge part of the lower wall to the upper wall; and
a rear wall that connects rear edge parts of the upper wall and the lower wall, and
the double panel structure forms a box structure as a whole.

7. The vehicle body rear part structure according to claim 5, wherein in the double panel structure, a reinforcing rib that extends in the vehicle front-rear direction is disposed in the box structure.

8. The vehicle body rear part structure according to claim 6, wherein in the double panel structure, a reinforcing rib that extends in the vehicle front-rear direction is disposed in the box structure.

9. The vehicle body rear part structure according to claim 1, wherein the double panel structure is formed of steel plates with a tensile strength of 1500 MPa or more.

10. The vehicle body rear part structure according to claim 9, wherein in the upper wall of the double panel structure, a strength of a rear edge part is set lower than a strength of other parts.

11. The vehicle body rear part structure according to claim 9, wherein the lower wall of the double panel structure has an opening, and a region on a rear side of the opening is formed to be thicker than other regions.

12. The vehicle body rear part structure according to claim 1, wherein the upper wall of the double panel structure extends to a region where the rear seat is disposed.

13. The vehicle body rear part structure according to claim 1, wherein a plurality of concavo-convex parts that extend along the vehicle front-rear direction are formed on at least one of the upper wall and the lower wall of the double panel structure.

14. The vehicle body rear part structure according to claim 1, wherein a plurality of concavo-convex parts that extend along the vehicle width direction are formed on at least one of the upper wall and the lower wall of the double panel structure.

15. The vehicle body rear part structure according to claim 3, wherein the inclined front walls incline forward from lower ends toward upper sides, and
an in-vehicle part is disposed below at least one of the inclined front walls.

16. The vehicle body rear part structure according to claim 4, wherein the inclined front walls incline forward from lower ends toward upper sides, and
an in-vehicle part is disposed below at least one of the inclined front walls.

17. The vehicle body rear part structure according to claim 3, wherein the double panel structure comprises:
side walls on left and right sides that connect side edge parts of the upper wall and the lower wall; and
a front wall that connects a front edge part of the lower wall to the upper wall,
the side walls incline outward in the vehicle width direction from lower ends to upper sides, and
the front wall inclines forward from a lower end toward an upper side.

18. The vehicle body rear part structure according to claim 4, wherein the double panel structure comprises:
side walls on left and right sides that connect side edge parts of the upper wall and the lower wall; and
a front wall that connects a front edge part of the lower wall to the upper wall,
the side walls incline outward in the vehicle width direction from lower ends to upper sides, and
the front wall inclines forward from a lower end toward an upper side.

19. The vehicle body rear part structure according to claim 15, wherein the double panel structure comprises:
side walls on left and right sides that connect side edge parts of the upper wall and the lower wall; and
a front wall that connects a front edge part of the lower wall to the upper wall,
the side walls incline outward in the vehicle width direction from lower ends to upper sides, and
the front wall inclines forward from a lower end toward an upper side.

20. The vehicle body rear part structure according to claim 1, wherein the double panel structure is configured by a hollow tubular member.

* * * * *